(No Model.)  
4 Sheets—Sheet 1.

J. A. HOUSE.
COTTON HARVESTER.

No. 450,584. Patented Apr. 14, 1891.

Witnesses  
Wm. J. Tanner  
A. J. Tanner

Inventor  
James A. House.  
by his attorney  
D. H. Hubbard (No Model.) 4 Sheets—Sheet 2.

J. A. HOUSE.
COTTON HARVESTER.

No. 450,584. Patented Apr. 14, 1891.

Witnesses
Wm. J. Tanner
A. J. Tanner

Inventor
James A. House
by his attorney
J. H. Hubbard (No Model.) 4 Sheets—Sheet 3.

J. A. HOUSE.
COTTON HARVESTER.

No. 450,584. Patented Apr. 14, 1891.

Fig. 3.

Witnesses
Wm. J. Danner
A. J. Janued

Inventor
James A. House
by his attorney
J. H. Hubbard (No Model.)

J. A. HOUSE.
COTTON HARVESTER.

No. 450,584. Patented Apr. 14, 1891.

Witnesses
Wm. J. Tanner
A. J. Tanner

Inventor
James A. House.
by his attorney
J. N. Hubbard

UNITED STATES PATENT OFFICE.

JAMES ALFORD HOUSE, OF BRIDGEPORT, CONNECTICUT, ASSIGNOR TO THE SOUTHERN COTTON HARVESTER COMPANY, OF NEW JERSEY.

COTTON-HARVESTER.

SPECIFICATION forming part of Letters Patent No. 450,584, dated April 14, 1891.

Application filed August 11, 1890. Serial No. 361,715. (No model.)

*To all whom it may concern:*

Be it known that I, JAMES ALFORD HOUSE, a citizen of the United States, residing at Bridgeport, in the county of Fairfield and State of Connecticut, have invented certain new and useful Improvements in Cotton-Harvesters; and I do hereby declare the following to be a full, clear, and exact description of the invention, such as will enable others skilled in the art to which it appertains to make and use the same.

This invention relates to certain new and useful improvements in cotton-harvesting machines, and has for its object to improve in certain particulars upon the construction shown and described in Letters Patent of the United States granted to Clinton Eugene Graves on the 3d day of December, 1889, No. 416,407.

It is further an object of my invention to furnish a novel means for preventing the escape of the cotton at the bottom of the machine, to provide a carrier system for the delivery of the cotton to the conveyers; and with these ends in view my invention consists in the construction and the several combinations of co-operating elements hereinafter to be fully and in detail explained, and then recited in the claims.

In order that those skilled in the art to which my invention appertains may fully understand the construction and method of operation of my improved harvester, I will describe the same in detail, reference being had to the accompanying drawings, which form a part of this specification, in which—

Figure 1:
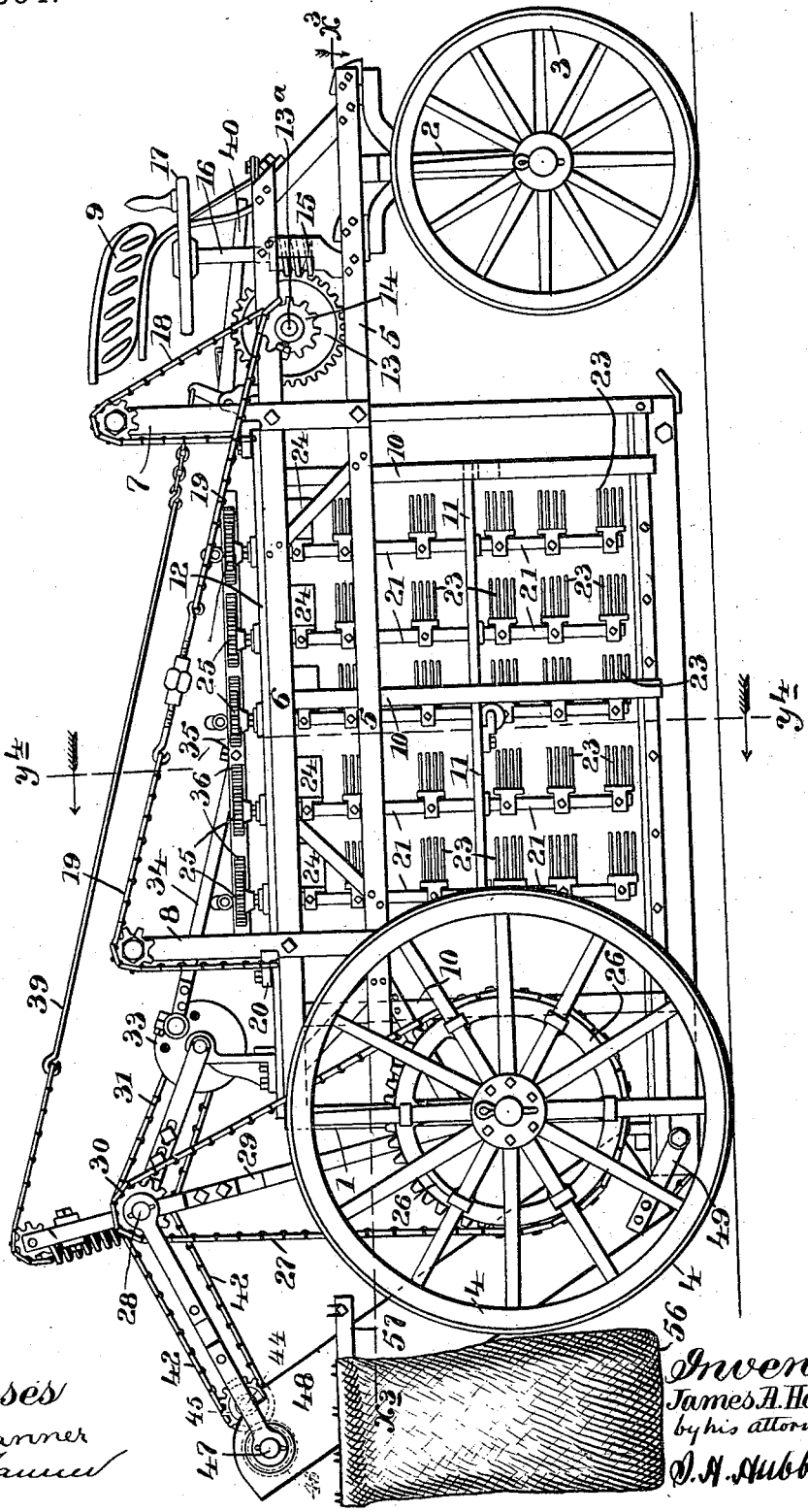
Figure 2:
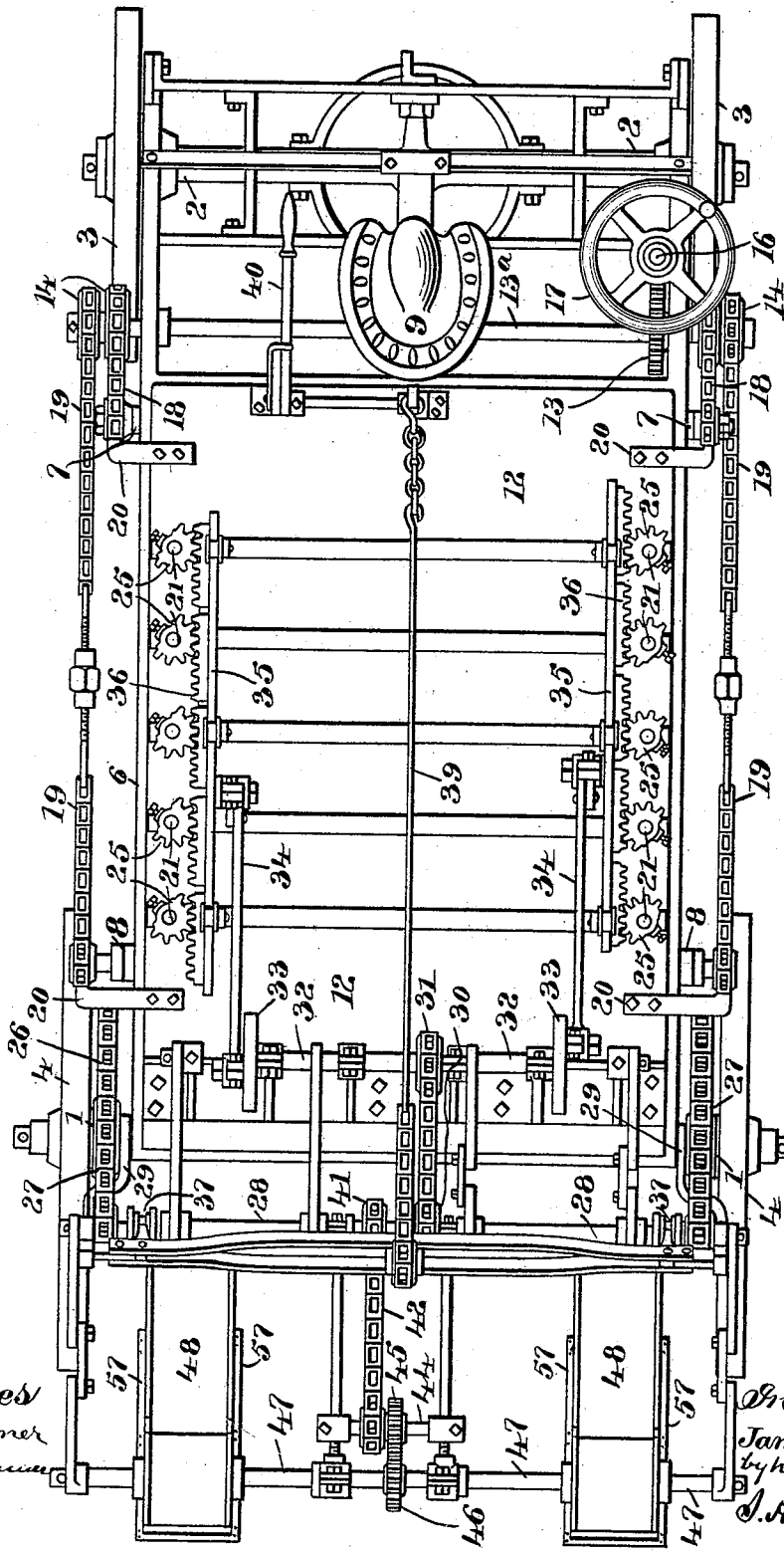
Figure 4:
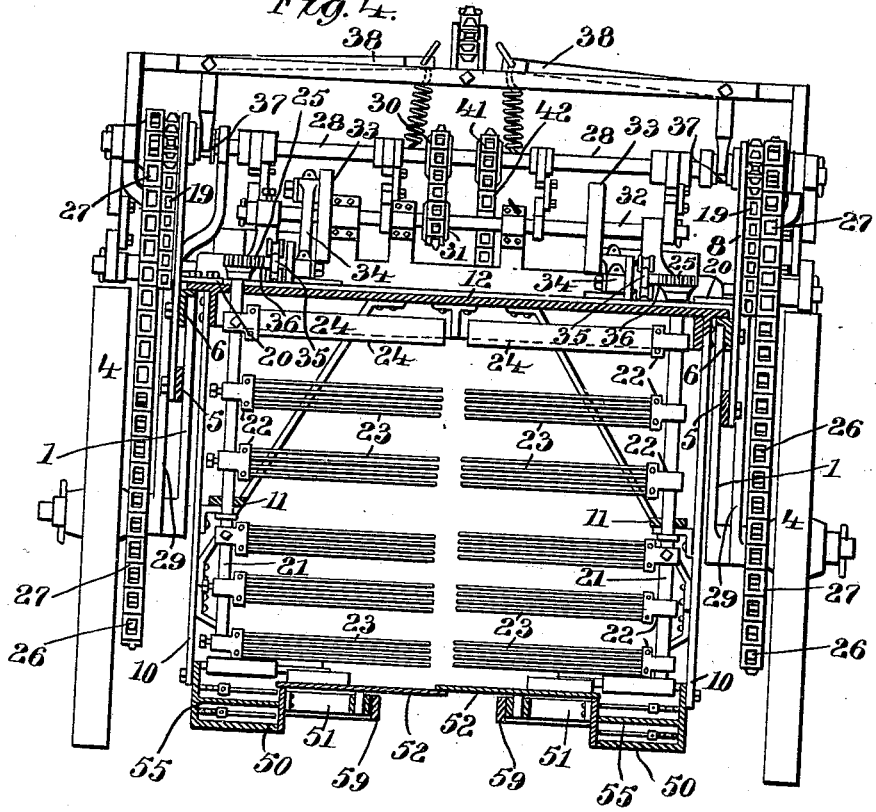
Figure 5:
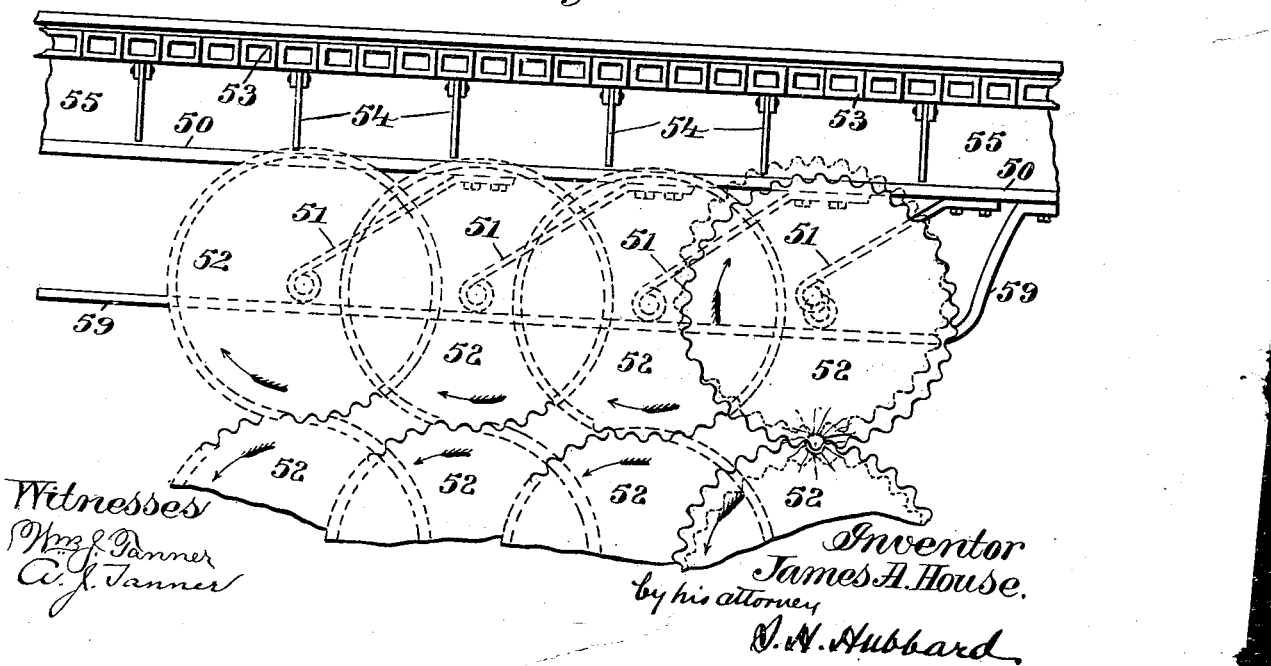

Figure 1 is a side elevation; Fig. 2, a plan view; Fig. 3, a horizontal section taken on the line $x^3$ of Fig. 1; Fig. 4, a vertical transverse section at the line $y^4$ of Fig. 1, looking in the direction of the arrow; Fig. 5, a partial detail plan view showing the construction and operation of the disk-carriers and the conveyers.

Like numerals denote the same parts in each of the several figures.

The permanent and fixed frame-work upon which the movable and operative parts of the machine are mounted consists of two cranked axles 1 2, upon which are mounted the traction-wheels 3 4, the latter of these two pairs of wheels being adapted to impart power to the machine, as will presently appear.

5 and 6 are longitudinally-arranged girders which connect the two pairs of wheels. Vertical standards 7 and 8 are secured to and project upwardly above the girders 5 6. A suitable seat 9 is carried upon the front of the frame-work just described. Arranged within and supported upon this permanent frame-work is a movable frame, which consists of the side bars 10, held by means of the longitudinal braces 11. It has also, by preference, diagonal braces or bars. Said frame has a closed top 12, which serves as a floor for the support of certain operating parts, presently to be described. This frame is adapted to be raised and lowered bodily within and relative to the permanent frame-work in the following manner: A gear 13, having its shaft $13^a$ journaled transversely to the length of the machine, is arranged near the front of the permanent frame-work. Fast upon the shaft of this gear are two double sprocket-wheels 14, one at each end. A worm 15, arranged upon a vertical shaft 16, meshes with the gear just described and is adapted to rotate said gear, a wheel or crank 17 being provided for the proper operation of the worm.

Secured to the double sprocket-wheel 14 and adapted to be wound thereon are chains 18 and 19. The former extend over pulleys on the top of the standards 7, and the latter are similarly arranged over pulleys journaled on the top of the standards 8. The ends of all four of these chains are connected with the movable frame by means of brackets 20, which latter preferably have a bearing against and are guided by means of the standards 7 and 8. Within this movable frame are two rows of vertically-disposed rock-shafts 21, one row at either side of the machine. Each of said rock-shafts has two or more bearings, preferably in the bars 11 and the floor 12, as seen at Fig. 4. Upon each of these rock-shafts I arrange in vertical series and to any desired number whips which consist of a base-block 22, having set therein so as to project inwardly within the frame a series of resilient wires 23. The size and the number of wires in these whips is immaterial, and I contemplate making the wires readily detachable, so that their number may be freely varied to adapt the machine for work under varying conditions. The blocks are provided with means for securing them in engagement with the vertical shaft, so that they may be raised and lowered thereon.

Upon each of the shafts just below the top or floor of the frame-work and above the whips is a fan-blade 24, whose action and purpose will be presently explained. As seen at the plan view, Fig. 2, the upper extremities of these shafts are provided with sectoral pinions 25, through and by means of which the shafts are operated.

Referring now particularly to Fig. 1, 26 are sprocket-wheels secured to and carried by the wheels 4. Over these sprocket-wheels run drive-chains 27, which communicate power to a transverse shaft 28, said shaft being journaled in a pair of uprights 29, secured on the permanent frame. As seen at Fig. 2, the shaft 28 carries a sprocket-wheel 30, from which a chain-and-sprocket connection, designated as 31, communicates rotary movement to a transverse shaft 32. At each end the shaft 32 is provided with a cranked disk 33, to each of which disks is adjustably secured a pitman 34, whose stroke may be varied by the adjustability of its connection with the disk. The pitmen have their outer ends connected to bars 35, arranged to slide on the floor 12 and whose outer extremities are provided with driving-racks 36, which mesh with and are adapted to operate the pinions 25, and through them the rock-shafts, so that, as will be readily understood, a vibratory movement within the frame will be imparted to the whips which are carried upon the rock-shafts.

By reference to Fig. 2 it will be observed that the crank-disks and pitmen are so secured and arranged as to impart opposite movements to the two rows of shafts. In this way the whips upon one side of the frame-work are vibrating in one direction, and the whips upon the opposite side are moving in the contrary direction. This is my preferred construction and arrangement; but it is obvious that by changing the connection between the cranks and pitmen any desired relation of movement between the two sets of whips may be obtained.

For the purpose of throwing off the power for the purpose of moving the machine from place to place, I prefer to arrange upon the shaft 28 a pair of clutches 37, one at each end, for the purpose of either applying the power from the chains 27 to said shaft 28 or of causing said chains to revolve their driven gears idly. These clutches are operated by a pair of L-shaped spring-actuated levers 38, the movement of said levers opposite to the pull to the springs being effected through the rod-and-chain connection 39, whose position is controlled by a lever 40 convenient to the driver's seat.

Upon the shaft 28 is arranged a sprocket-wheel 41, which, through a chain 42, imparts movement to a short shaft 44. This shaft 44 carries a gear 45, which meshes with and drives a gear 46 and the shaft 47, upon which said gear is attached. This shaft 47 passes through the upper ends of two boxes 48, in which are arranged the conveyers, presently to be described, the other ends of said boxes being hinged to the bottom of the movable frame-work, as seen at 49.

Referring now more particularly to Figs. 4 and 5, the lower end of the movable frame-work is provided at either side with a longitudinally-extending trough 50, upon whose opposed inner surfaces are secured a series of resilient arms 5, each provided with a tubular bearing in its extremity. Each one of these bearings has journaled therein a disk 52, having sinuously-formed edges, (see Fig. 5,) said disks being arranged in pairs, the edges of the members of each pair overlapping slightly at the median line of the machine. These disks serve as a sectional floor, whereby the bottom of the machine is substantially closed and the escape of the cotton to the ground prevented, and they also serve to carry the cotton which falls thereon and deliver the same to the conveyer, as will be presently explained. The conveyers consist of a chain or belt 53, which is driven by the shaft 47, and carries upon it conveyer arms or buckets 54. The trough 50 heretofore referred to is divided by a horizontal partition 55 into two compartments. The upper compartment is a trough whose bottom is somewhat below the plane of rotation of the disks 52, which latter slightly overlaps its edges. The conveyer chain or belt, which is of course endless, runs through the two compartments of this trough and then upward through the boxes 48, which are likewise divided into compartments. That part of the chain which is moving rearwardly runs in the upper part of the trough, and the conveyer-arms sweep up the cotton which has been deposited within their field of operation, carry it along the trough, and then upward through the boxes 48 to deliver it into bags 56, which are secured upon suitable support or frame-work 57. In returning from the sack to the forward end of the machine the conveyer-chain travels through the lower half of the box 48 and in the lower compartment of the trough.

58 are guards of light spring metal. They project over the two forward disks and clear the cotton therefrom, as will presently be explained.

59 are braces extending from front to rear beneath the disks outside their centers. Said braces limit the movement of said disks toward the center and afford them support from below.

The operation of my invention is as follows: The machine is first adjusted according to the height of the plants to be operated upon, and this is effected by raising or lowering the movable frame and the parts attached thereto by means of the hand-wheel and the chains operated by means of the latter. For operating upon plants of considerable height the movable frame is raised, while for low bushes it is lowered, so as to include and operate upon the whole plant. When properly adjusted, the machine is drawn along by horses with the wheels astride the cotton-row. The progression of the machine supplies the necessary power to operate the several mechanisms through the rotation of the hind wheels. Referring particularly to Figs. 3 and 5, as the machine passes over the row the stalks of the plants pass successively between the disks at the bottom of the machine, which latter yield laterally to admit them. In their passage the bushes turn the disks upon their axes in the direction of the arrows, which movement of said disks not only serves, as will presently appear, to dispose of the cotton, but also diminishes the resistance with which the stalks would meet if their contact with the disks were other than a rolling contact. As soon as the plant has passed the first pair of disks it is within the field of operation of the whips, which, actuated by the mechanism heretofore described, have a vibratory motion through an arc of, say, forty-five degrees within the frame-work. The action of these whips is to thrash out and dislodge the ripe cotton from the bolls at both the forward and backward movement of the whips. The wires, however, are of such elasticity as not to knock off or injure the partially ripe or otherwise unsuitable bolls, and will therefore inflict very slight injury upon the branches. The operation of the whips is supplemented by the movement of the fan-blades at the top of the frame-work, which generates a current of air. This current assists in dislodging the cotton and tends to carry the cotton dislodged by the whips downward toward the bottom of the frame. When it has lodged upon the plates or disks heretofore referred to, it is gradually carried by the rotation of the disk upon which it has fallen toward the trough in which the conveyers run, said rotation being step by step and effected by the stalks themselves. As seen at Fig. 3, let us suppose a boll of cotton to have fallen upon the end disk at $a$. As said disk rotates step by step, as aforesaid, the cotton is carried around with it until it comes in contact with the guard which extends over the surface of the plate and is thereby dropped into the trough within reach of the conveyer. As the guard operates with relation to the end disk, so likewise does the edge of each disk operate toward the disk which underlies it—that is to say, the first disk clears the second disk of cotton, the second the third, and so on. It is not necessary, therefore, that a separate guard be used for each disk. As the cotton falls into the trough, it is carried along by the conveyer and is finally dropped by the latter into the sack or other suitable receptacle arranged at the rear end of the machine.

In this invention I do not wish to be confined to the exact details of construction which are herein shown and described, since these may be widely varied without departing from the spirit and aim of my invention, which is set forth in the first paragraph of the specification, and which I deem to be commensurate with the terms of the claims.

I claim—

1. The combination, with the permanent frame, of the vertically-movable frame arranged within said permanent frame, a series of vertical shafts arranged within said movable frame, resilient whips projecting inward from said shafts, and a series of fan-blades arranged above and adapted to co-operate with the whips in operating upon the cotton-plant.

2. In a cotton-harvester, the combination, with the frame-work whereby the moving parts are supported, of the whips arranged within said frame, fan-blades arranged above the whips, and means, as described, for imparting to said whips and to the fan-blades a vibratory movement with the frame, substantially as described.

3. In a cotton-harvester, the combination, with the vertical shafts and means for supporting them, and the whips mounted upon said shafts, of toothed segments secured upon the upper ends of said shafts, racks meshing with said toothed segments, and means for imparting the appropriate movement to the racks, substantially as described.

4. In a cotton-harvester, the combination, with the wheel, the permanent frame, and the movable frame, of the rock-shafts mounted within the movable frame, the rack-and-pinion mechanism, whereby movement is imparted to said rock-shafts for the vibration of the whips, and driving mechanism interposed between the wheels and the racks, whereby reciprocatory movement is imparted to the latter.

5. In a cotton-harvester, the combination, with the frame and means carried thereby for operating upon the cotton-plant, of a series of circular overlapping disks arranged at the bottom of the frame-work, and outwardly-projecting spring-arms having journal-bearings for the support of the disks, substantially as described.

6. In a cotton-harvester, the combination, with the frame and means for operating upon the cotton-plant, of a series of pivoted overlapping rotative disks having sinuously-formed peripheries, said disks having capacity both for lateral and for completely rotative movement, substantially as described.

7. In a cotton-harvester, the combination, with the picking devices and a supporting-frame therefor, of a series of completely rotative disks, each having independence of movement, and longitudinally-arranged conveyers adapted to receive cotton from said disks, substantially as described.

8. In a cotton-harvester, the combination, with the devices for operating upon the bush, and the frame whereon said devices are carried, of the overlapping rotative carrier-disk arranged at the bottom of the frame, troughs at the side of said disks and below the plane thereof, and conveyers operating longitudinally in said troughs, substantially as described.

In testimony whereof I affix my signature in presence of two witnesses.

JAMES ALFORD HOUSE.

Witnesses:
JAMES CARR,
S. S. DIMOND.